Figure 1:
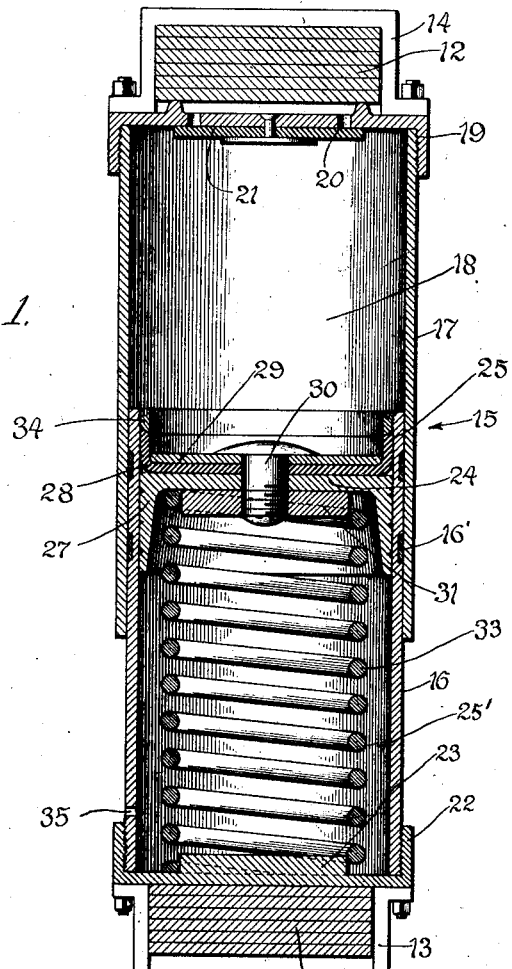

C. H. HAMMERSMITH.
SHOCK ABSORBER.
APPLICATION FILED SEPT. 12, 1913.

1,113,619.

Patented Oct. 13, 1914.

Witnesses:
Robert F. Weir
Mary F. Allen

Inventor
Charles H. Hammersmith
Fonée Rain & May
Attys

UNITED STATES PATENT OFFICE.

CHARLES H. HAMMERSMITH, OF BROOKFIELD, ILLINOIS.

SHOCK-ABSORBER.

1,113,619.  Specification of Letters Patent.  Patented Oct. 13, 1914.

Application filed September 12, 1913. Serial No. 789,414.

*To all whom it may concern:*

Be it known that I, CHARLES H. HAMMERSMITH, a citizen of the United States, residing at the village of Brookfield, in the county of Cook and State of Illinois, have invented certain new and useful Improvements in Shock-Absorbers, of which the following is a specification.

My invention relates to improvements in shock absorbers and more particularly to devices intended for application to an automobile for coöperation with the spring structures which ordinarily are interposed between the running gear and body members of the machine.

One of the objects of my invention is to provide a pneumatic shock absorber, in which, under approaching movement between the running gear and frame member, two relatively movable elements are caused to compress air therebetween to relieve the shock, but wherein a supplemental yieldably movable part coacts with the compressed air chamber, so that under extreme movement of the two elements, which are connected to the running gear and frame member respectively, the air cannot be compressed to a sufficient extent effectively to transmit the shock, or brought under such high pressure as to cause an unduly active recoil.

In the drawings I have illustrated one simple and efficient embodiment of my invention for purposes of full disclosure, but it will be understood by those skilled in the art that other forms of apparatus and details of construction may be employed for embodiment of my invention hereinafter claimed.

Figure 2:
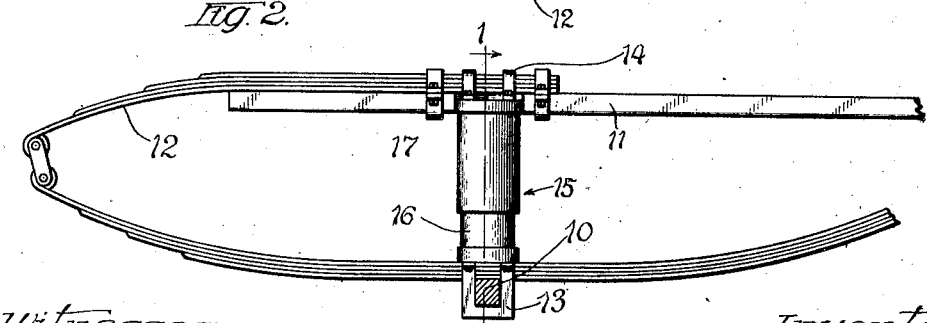

In the drawings Figure 1 is a central vertical cross section on line 1—1 of Fig. 2. Fig. 2 is a side elevation of a portion of an automobile chassis equipped with my invention.

A running gear element,—typified as axle 10,—and a frame element, 11, of an automobile are ordinarily interconnected by a suitable spring structure 12 for relative vertical movement. With the details of such fundamental construction my present invention is not concerned but in the exemplification shown the lower attaching stirrup 13 is assumed to be attached to the lower part of the spring 12 and to the axle 10 as typifying any suitable connection of the lower end of the shock absorber with a running gear element. Generally the upper stirrup construction 14 typifies any suitable connection of the upper end of the shock absorber with the body member to permit the desired movement between the upper and lower members of the shock absorber.

15 indicates a pneumatic shock absorbing device comprising telescoping lower and upper members 16 and 17 which, as the lower piston member is forced into the upper cylinder member, may compress air in a cylinder chamber 18 inclosed by the two members. Specifically, member 17 consists of a cylinder shell secured in the head 19 preferably having intake ports 20 therein underlaid, on the interior of the shell, by a flat flexible leather check-valve 21, or otherwise suitably equipped for outward closure to prevent the escape of air from chamber 18, and for inward opening to admit air thereto. The coacting piston member 16 is preferably made also in the form of a hollow shell having a base 22 to which the stirrup 13 is secured, said base providing a central internal boss 23 and said piston shell being provided at its upper end with a transverse piston head 24.

Manifestly with this construction, as the piston 16 is forced inward in cylinder 17, air is compressed in the chamber 18. Under normal load, or where the automobile is running on smooth surface, the device will stand with the air contained in chamber 18 but little above atmospheric pressure. Such a device responds to even slight shocks upon the running gear member by movement of the piston within the cylinder, the air cushion serving to help absorb the shock and the device not materially lessening the light-shock absorbing capacity of the vehicle springs 12. Under heavier shocks, however, as where the vehicle strikes an abrupt projection in the road, the relatively extended movement between the piston 16 and cylinder 17 tends to compress the air in the chamber 18 to a high degree and the highly compressed air, of course, is less effective than air under less compression in absorbing the shock or preventing the communication thereof to the vehicle body, although of course even under such conditions, and if the piston head 24 were solid, the device would be a material aid to the springs 12 in absorbing the shock. However for the principal purpose of preventing undue compression of air within the chamber 18 under extreme movement of the cylinder and piston parts which are directly movable with the body and frame members, I provide, in communication with said chamber, a supplemental chamber part, one wall of which is yieldable under the pressure of the air compressed in chamber 18, so that the yielding of said wall may prevent undue compression of the air in the chamber 18. In the specific construction shown I preferably provide such chamber, as at 25', within the piston 16 and it is to this end that the piston is made in the form of a shell. The piston head 24 is movable within said supplemental chamber in the shell, said head being itself constructed to provide a trunk piston part 27 and overlying flexible cup 28, a retaining washer 29 and a connecting bolt 30, having a nut 31 on the under side of the piston. The boss 23 and nut 31 serve to position axially a compressible coil spring 33, which acts yieldingly to maintain the head 24 normally at its upper limit of throw where its valve cup 25 presses against an annular valve rim 34 screwed into the upper extremity of the shell 16, so reducing to substantially naught the air receiving capacity of the supplemental chamber. It is my preference that the chamber 25' below the movable trunk piston 27 shall be provided with ports, as 35, for free entrance and exit of air, but, if preferred, said chamber may be made air tight throughout its walls, so that movement of the head 24 may compress air therein to afford gradually increasing resistance supplementing the resistance of spring 33.

In practice the spring 33 is made strong enough to resist the air pressure brought upon the trunk piston 27 of head 24 which is incident to the movement of piston 16 through a considerable range within the cylinder 17, but it will be manifest that when the movement of piston 16, with the cylinder 17, is so great that the air in the now-reduced chamber 18 is under pressure sufficient to overcome the resistance of spring 33, the supplemental piston 27 of main piston 16 yields against the spring 33 thereby increasing the dimensions of the chamber 25 which communicates with chamber 18 directly and in this way preventing the air under compression in chamber 18 from being compressed to such a degree as unduly to transmit shock from the running gear to the body.

Of course during restoration to their normal positions the parts work in just the opposite fashion to that described, spring 33 bringing the supplemental piston 27 back to normal position as the air pressure in chamber 18 decreases and piston 16 as a whole moving outwardly to normal position in the cylinder 17.

Any sudden separation of the running gear and frame parts 10 and 11, due for instance to the wheels following an abrupt depression in the path of travel, results in a sudden retraction of the piston 16, as a whole, which would tend to rarefy the air in chamber 18 and this results in the opening of valve 21 and the introduction of a quantity of air to maintain approximately atmospheric pressure in chamber 18.

Having described my invention, what I claim is:—

1. The combination with running gear and frame elements, of a pneumatic shock absorber comprising coacting chamber-forming parts relatively movable directly with the running gear and frame members for compression of the chambered air; a spring resisted yielding wall movable to enlarge said chamber under the action of the compressed air therein, and an inwardly opening check valve in the wall of said chamber open at its outer side to the atmosphere.

2. In a pneumatic shock absorber, a cylinder; a piston therein, means for rigid connection of said cylinder and piston with vehicle running gear and frame members respectively, whereby they may coact to compress air when the running gear and frame members, to which they are attachable, approach each other, said piston having therein a spring resisted yielding wall open at its outer face to the atmosphere.

3. In a pneumatic shock absorber, a cylinder; means to connect it with one element of a vehicle; a piston in said cylinder; means to connect it with another member of the vehicle, said piston comprising a hollow shell; a supplemental piston positioned entirely within the last mentioned piston and reciprocable therein, yielding means opposing the movement of said supplemental piston within said piston shell and an inwardly opening check valve being open to the atmosphere.

4. In a pneumatic shock absorber, a piston structure comprising a shell; a base for such shell; a movable piston head reciprocable in said shell; a stop for limiting the outward throw of said piston head with respect to said shell; yielding means normally maintaining said head against said stop; a cylinder coacting with said piston structure as a whole, said cylinder having a port therein and an outwardly closing check valve for said port, the outer side of said valve being open to the atmosphere.

5. In a pneumatic shock absorber, the combination of a cylinder, a second cylinder positioned with its open end telescoping within the open end of the first mentioned cylinder, a piston slidable within the second cylinder, resilient means acting upon said piston and normally holding the same in the open end of its cylinder, and an inwardly opening check valve in the first mentioned cylinder with its outer face open to the atmosphere.

In testimony whereof I hereunto set my hand in the presence of two witnesses.

CHARLES H. HAMMERSMITH.

In the presence of—
G. E. WOLF,
O. A. THOMPSON.

Copies of this patent may be obtained for five cents each, by addressing the "Commissioner of Patents, Washington, D. C."